No. 710,368. Patented Sept. 30, 1902.
F. H. RICHARDS.
MANUFACTURE OF PLAYING BALLS.
(Application filed June 25, 1902.)

(No Model.)

Witnesses:
Robert Head
R. W. Pittman

Inventor:
F. H. Richards

UNITED STATES PATENT OFFICE.

FRANCIS H. RICHARDS, OF HARTFORD, CONNECTICUT, ASSIGNOR TO THE KEMPSHALL MANUFACTURING COMPANY, A CORPORATION OF NEW JERSEY.

MANUFACTURE OF PLAYING-BALLS.

SPECIFICATION forming part of Letters Patent No. 710,368, dated September 30, 1902.

Application filed June 25, 1902. Serial No. 113,078. (No model.)

*To all whom it may concern:*

Be it known that I, FRANCIS H. RICHARDS, a citizen of the United States, residing at Hartford, in the county of Hartford and State of Connecticut, have invented certain new and useful Improvements in the Manufacture of Playing-Balls, of which the following is a specification.

This invention relates to playing-balls, the object being to provide a ball of improved construction and quality especially adapted for use in the game of golf.

According to my present improvements I employ a core or center piece, which I usually make of metal, but which may be made of celluloid, gutta-percha, or the like, and this core is incased within an envelop of soft rubber which is originally provided with pockets, said envelop being incased within a hard stiff springy shell formed of gutta-perch or other plastic material.

Figure 1:
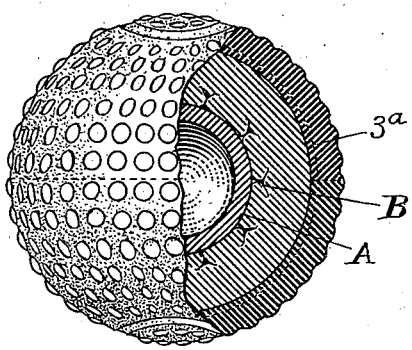
Figure 2:
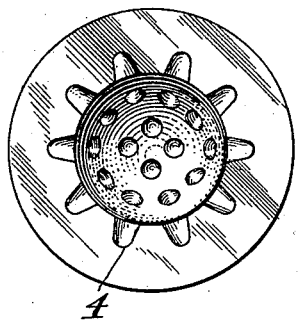
Figure 3:
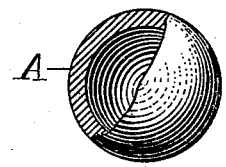
Figure 4:
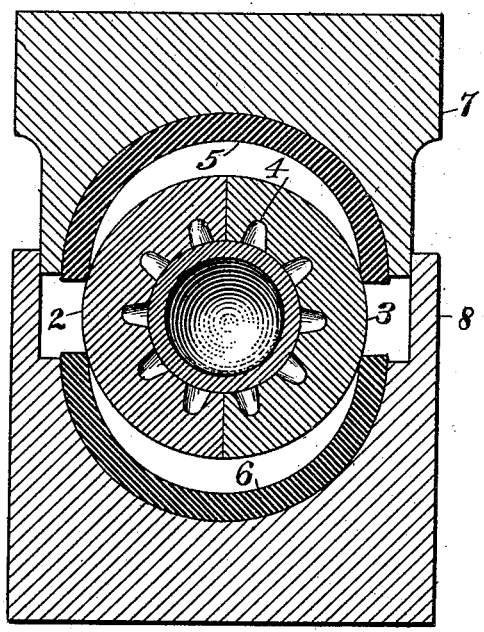

In the drawings forming part of this specification, Figure 1 illustrates a complete ball, partly broken away to disclose the construction. Fig. 2 illustrates a hemispherical segment of soft rubber provided with pockets or recesses. Fig. 3 illustrates a hollow hard center piece, and Fig. 4 illustrates the preferred method of completing the ball.

Upon a metal or other hard core A, I apply and preferably cement hemispherical segments 2 and 3, of soft rubber, which are provided with recesses or pockets 4, preferably upon or close to the interior side of said envelop. Upon the ball thus formed I apply hemispherical gutta-percha shell-segments 5 and 6, and the whole I place between heating and forming dies 7 and 8, which I bring together forcibly while heated, thereby closing the shell upon the ball and welding the edges of the former.

One of the objects of compressing the shell upon the envelop is to place the latter in a state of normal compression, thereby increasing the efficiency of the ball. The compression is carried to an extent to at least reduce the size of the recesses 4 and preferably to close them entirely, as at B, Fig. 1, at which figure the original diameter of the rubber envelop is indicated by the dotted curve $3^a$. It will be understood that by the action of the heat the gutta-percha shell or cover is softened and that owing to the compression the rubber sphere is reduced, the compression being maintained while the gutta-percha segments weld together and harden, the rubber sphere being thus held permanently reduced in bulk or diameter, as at Fig. 1.

It is to be understood that while the cells or pockets in the original envelop are shown disposed on the interior side or portion of said envelop and opening upon the face of the core, still cellular soft rubber and solid soft rubber may be otherwise disposed, and other modifications and changes may be resorted to without departing from the spirit of this invention.

Having described my invention, I claim—

1. A process in producing a playing-ball, consisting in inclosing a center piece of hard material within a sphere or layer of soft, resilient material in which pockets or crevices are provided; surrounding said soft sphere by softened plastic material; subjecting the whole to compression to an extent to at least partially close said pockets or crevices and reduce the bulk or diameter of said soft sphere; and maintaining the compression while the plastic material hardens.

2. A process in producing a playing-ball, consisting in inclosing a center piece of hard material within a sphere or layer of soft rubber in which pockets or crevices are provided; surrounding said soft rubber by heated plastic material; subjecting the whole to compression to an extent to at least partially close said pockets or crevices and reduce the bulk or diameter of said soft-rubber sphere; and maintaining the compression until said plastic material hardens, so that it may hold said soft-rubber sphere permanently reduced in bulk or diameter.

3. A process in producing a playing-ball, consisting in inclosing a center piece of hard material within a sphere or layer of soft, resilient material in which pockets or crevices are provided; surrounding said soft sphere by heated gutta-percha; and subjecting the whole to compression to an extent to close said pockets or crevices and solidify said soft sphere.

4. A process in producing a playing-ball, consisting in forming a hard center piece, applying thereto collapsible spherical segments of soft rubber, inclosing said soft rubber in softened plastic material, subjecting the whole to compression to an extent to cause said soft-rubber sphere to collapse, and maintaining the compression while the plastic material hardens.

5. A process in producing a playing-ball, consisting in forming a hard center piece, applying thereto segments of soft rubber each provided at its inner surface with pockets, inclosing said soft rubber between heated segments of gutta-percha, applying compression to said segments so as to at least partially close said pockets and reduce said rubber sphere in bulk and also cause the segments to weld; and maintaining the compression while the gutta-percha cools and hardens.

6. A process in producing a playing-ball, consisting in inclosing a hard center piece in a sphere or layer of solid soft rubber; providing one of said center-piece and sphere elements with openings; compressing upon said sphere a shell of softened plastic material; the compression being carried to an extent to at least partially close said openings; and maintaining the compression while the shell hardens, so that said soft-rubber sphere is held permanently reduced in diameter by the shell.

FRANCIS H. RICHARDS.

Witnesses:
B. C. STICKNEY,
JOHN O. SEIFERT.